US012078148B2

(12) United States Patent
Cole et al.

(10) Patent No.: US 12,078,148 B2
(45) Date of Patent: Sep. 3, 2024

(54) SYSTEM AND METHOD FOR DETECTING ANOMALIES IN WIND TURBINE CONTROL SIGNALS (71) Applicant: General Electric Company, Schenectady, NY (US)

(72) Inventors: Raymond Cole, Wilton, NY (US); Robert Dewey, Valatie, NY (US); Dhanannjay Deo, Altamont, NY (US); Anas Patankar, West Lafayette, IN (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/789,842

(22) PCT Filed: Dec. 31, 2019

(86) PCT No.: PCT/US2019/069056
§ 371 (c)(1),
(2) Date: Jun. 29, 2022

(87) PCT Pub. No.: WO2021/137857
PCT Pub. Date: Jul. 8, 2021

(65) Prior Publication Data
US 2023/0030681 A1    Feb. 2, 2023

(51) Int. Cl.
*F03D 17/00* (2016.01)
*F03D 7/04* (2006.01)
(Continued)

(52) U.S. Cl.
CPC ............. *F03D 17/00* (2016.05); *F03D 7/043* (2013.01); *F03D 80/50* (2016.05); *G05B 23/0281* (2013.01); *G05B 23/0283* (2013.01)

(58) Field of Classification Search
CPC ........... F03D 17/00; F03D 7/043; F03D 80/50
See application file for complete search history.

(56) References Cited

U.S. PATENT DOCUMENTS 7,895,016 B2 *  2/2011  Vittal ................. G05B 23/0283
                                                           702/182
10,865,772 B2   12/2020 Baba
(Continued)

FOREIGN PATENT DOCUMENTS

CN          104638664 A      5/2015
CN          104701989 B      12/2017
(Continued)

OTHER PUBLICATIONS

PCT International Search Report & Opinion Corresponding to PCT/US2019/069056 on Sep. 15, 2020.

*Primary Examiner* — Michael L Sehn
(74) *Attorney, Agent, or Firm* — Dority & Manning, P.A.

(57) ABSTRACT

A method for controlling a wind turbine includes receiving operational data of at least one component of the wind turbine. The operational data includes a time-series of one or more high speed signals both before, during, and after an anomaly. Further, the high speed signal(s) may be digital or analog signals. The method also includes storing the operational data. Moreover, the method includes analyzing the stored operational data to identify a specific type and location of the anomaly using at least one of pattern recognition, machine learning, or rules-based conditions. In addition, the method includes determining an appropriate response action for the specific type and location of the anomaly. Further, the method includes adjusting a control parameter of the wind turbine. Thus, the method includes implementing the appropriate response action for the specific type and location of the anomaly.

19 Claims, 6 Drawing Sheets (51) Int. Cl.
*F03D 80/50* (2016.01)
*G05B 23/02* (2006.01)

(56) References Cited

U.S. PATENT DOCUMENTS

| | | |
|---|---|---|
| 10,935,458 B2 | 3/2021 | Hayashi et al. |
| 2010/0138060 A1 | 6/2010 | Gao et al. |
| 2012/0078578 A1 | 3/2012 | Piccirillo et al. |
| 2017/0122291 A1 | 5/2017 | Barker et al. |

FOREIGN PATENT DOCUMENTS

| | | |
|---|---|---|
| CN | 105427566 B | 11/2018 |
| CN | 105046581 B | 5/2019 |
| CN | 110222851 A | 9/2019 |
| CN | 110244184 A | 9/2019 |
| CN | 110334127 A | 10/2019 |
| EP | 3514643 A1 | 7/2019 |
| GB | 2476448 B | 7/2015 |
| JP | 6503419 B2 | 4/2019 |

\* cited by examiner

SYSTEM AND METHOD FOR DETECTING ANOMALIES IN WIND TURBINE CONTROL SIGNALS

FIELD

The present disclosure relates generally to wind turbines, and more particularly to systems and methods for detecting anomalies in wind turbine control signals.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid. In addition, during operation, wind turbines produce and store a significant amount of low speed/low resolution and high speed/high resolution data.

Wind turbines can be very expensive and complex machines that need to be operated in the most efficient manner as possible to be profitable. The size and complexity of these machines, as well as their typical remoteness, means that costs (e.g. material, up-time, and/or labor) are all significant contributors to margins. For example, the rotor blades are typically rotated about a pitch axis via respective pitch bearings. Failure of one of the pitch bearings, however, requires a turbine shut down event, thereby decreasing annual energy production. In addition, pitch bearings are very costly to replace in the event of a failure due to the need of a large crane.

Accordingly, the present disclosure is directed to systems and methods for detecting anomalies in multiple wind turbine control signals by analyzing the high speed data being produced and correlating signal responses to operating inputs and conditions previously identified as being defective, degrading components, sub-components and/or abnormal operations. By identifying and associating specific signals and responses, appropriate control actions can be employed based on actual occurrences in the wind turbine, thereby minimizing operational and/or material costs associated with unnecessary replacement of parts, extending component life, reducing downtime, and minimizing troubleshooting labor costs. In addition, the present disclosure can increase safety by eliminating unnecessary work.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine in response to anomaly detection. The method includes receiving, via a processor, operational data of at least one component of the wind turbine. The operational data includes a time-series of one or more high speed signals both before, during, and after an anomaly. Further, the high speed signal(s) may be digital or analog signals. The method also includes storing the operational data of the component(s) of the wind turbine in a memory device with a processor. Moreover, the method includes analyzing, via the processor, the stored operational data of the component(s) of the wind turbine to identify a specific type and location of the anomaly using at least one of pattern recognition, machine learning, or rules-based conditions. In addition, the method includes determining, via the processor, an appropriate response action for the specific type and location of the anomaly. Further, the method includes adjusting control of the wind turbine. Thus, the method includes implementing, via the processor, the appropriate response action for the specific type and location of the anomaly.

In an embodiment, the high speed signal(s) may include signals representative of at least one of current, voltage, power, torque, temperature, position, direction, displacement, vibration, as well as any other signals produced by the or in the wind turbine or combinations thereof.

In another embodiment, analyzing the stored operational data of the component(s) of the wind turbine to identify the specific type and location of the anomaly may include, prior to detection of the anomaly, determining a plurality of different patterns of high speed signals each representing a different fault or operational state of the at least one component of the wind turbine and storing the plurality of different patterns in the memory device.

In further embodiments, analyzing the stored operational data of the component(s) of the wind turbine to identify the specific type and location of the anomaly may include identifying a pattern from the plurality of different patterns that corresponds to a pattern of the one or more high speed signals of the operational data stored within the memory device.

In additional embodiments, the method may include identifying pertinent information associated with the anomaly and storing the pertinent information in the memory device.

In an embodiment, the method may include determining one or more operational parameters of the wind turbine upon detection of the anomaly. For example, such operational parameter(s) of the wind turbine may include wind speed, wind direction, environmental conditions, grid conditions, pitch angle, rotor speed, generator speed, power output, or generator torque.

Thus, in certain embodiments, analyzing the stored operational data of the component(s) of the wind turbine to identify the specific type and location of the anomaly may include correlating the high speed signal(s) to the operational parameter(s) to evaluate an effect of the operational parameter(s) on the high speed signal(s).

In another embodiment, analyzing the stored operational data of the component(s) of the wind turbine to identify the specific type and location of the anomaly may include defining a severity of the anomaly.

In further embodiments, the appropriate response action may include at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof. In yet another embodiment, the appropriate response action may be implemented automatically.

In several embodiments, the method may include scheduling the maintenance action based on the one or more operational parameters of the wind turbine to maximize operational efficiency of the wind turbine and to minimize equipment downtime.

In still another embodiment, adjusting the control of the wind turbine may include shutting down the wind turbine, derating the wind turbine, uprating the wind turbine, or modifying a control setting of the wind turbine.

In another aspect, the present disclosure is directed to a system for controlling a wind turbine in response to anomaly detection. The system includes a processor configured to implement a plurality of operations, including but not limited to receiving operational data of at least one component of the wind turbine, the operational data comprising a time-series of one or more high speed signals both before, during, and after an anomaly, the one or more high speed signals being digital or analog signals, analyzing the operational data of the at least one component of the wind turbine to identify a specific type and location of the anomaly using at least one of pattern recognition, machine learning, or rules-based conditions, determining an appropriate response action for the specific type and location of the anomaly, adjusting control of the wind turbine, and implementing the appropriate response action for the specific type and location of the anomaly. It should also be understood that the system may further include any of the additional features and/or steps as described herein.

In still another aspect, the present disclosure is directed to a method for controlling a wind turbine in response to anomaly detection. The method includes determining, via a processor, a plurality of different patterns of high speed signals of the wind turbine. Each of the plurality of different patterns represent a different fault or operational state of the component(s) of the wind turbine. Further, the method includes storing the plurality of different patterns in a memory device of the processor. The method includes receiving, via the processor, operational data of at least one component of the wind turbine. The operational data includes a time-series of high speed signals both before, during, and after an anomaly. Moreover, the time-series of high speed signals may be digital or analog signals. In addition, the method includes identifying a pattern from the plurality of different patterns that corresponds to a pattern of the time-series of high speed signals of the operational data stored within the memory device to identify a specific type and location of the anomaly using at least one of pattern recognition, machine learning, or rules-based conditions. Thus, the method includes generating and sending, via the processor, an alarm indicative of the specific type and location of the anomaly.

It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for detecting anomalies in wind turbine control signals. Wind turbines generally produce and store a significant amount of high speed/high resolution data. By analyzing the high speed data being produced and correlating signal responses to operating inputs and conditions, the wind turbine controller or any suitable processor can identify specific defective, degrading components, sub-components and/or abnormal operations. By identifying and associating specific signals and responses, the controller can determine what is actually occurring in the wind turbine and develop appropriate control actions in response thereto. As such, the systems and methods of the present disclosure are configured to minimize operational and/or material costs associated with unnecessary replacement of parts, extend component life, reduce downtime, and minimize troubleshooting labor costs.

Figure 1:
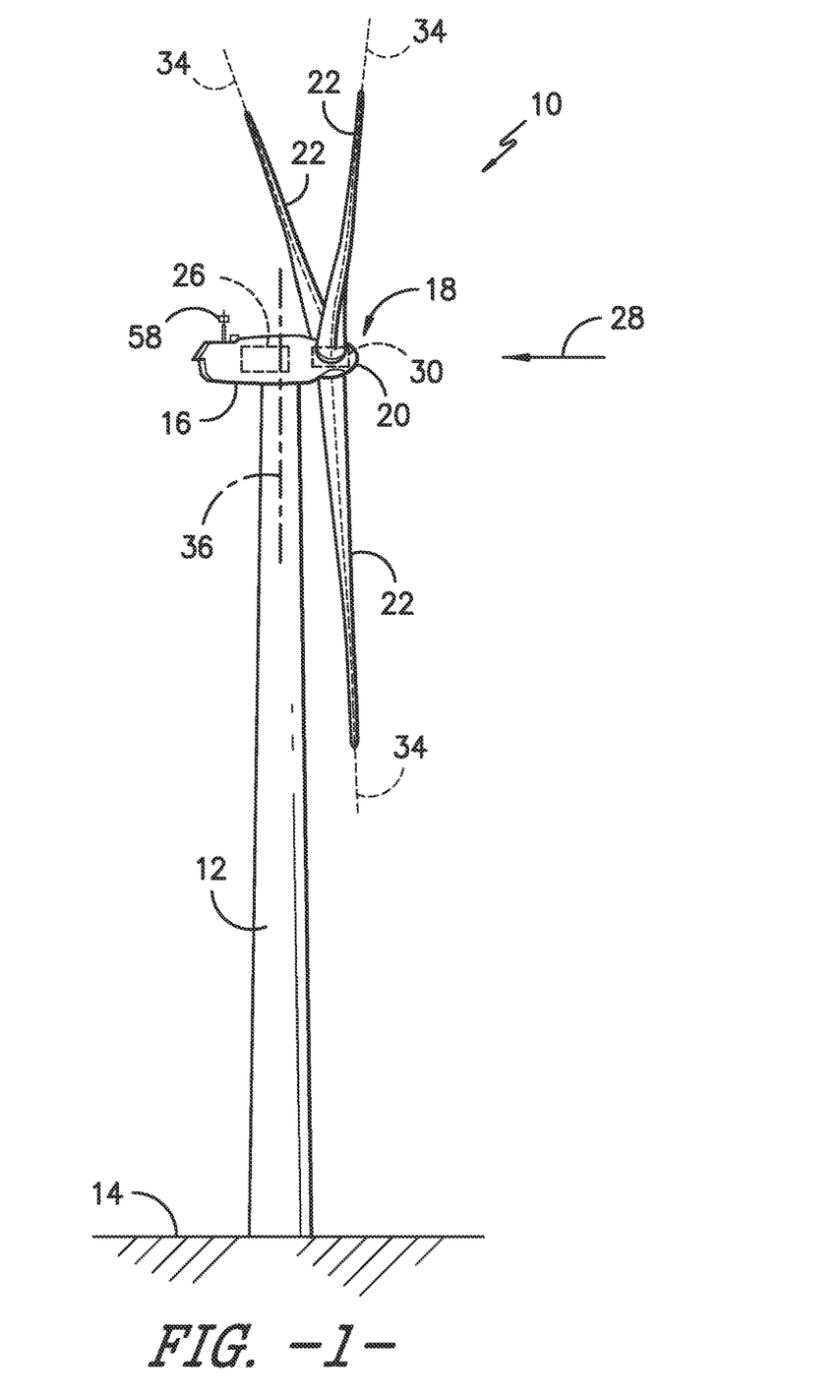
FIG. 1 illustrates a perspective view of a wind turbine according to one embodiment of the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
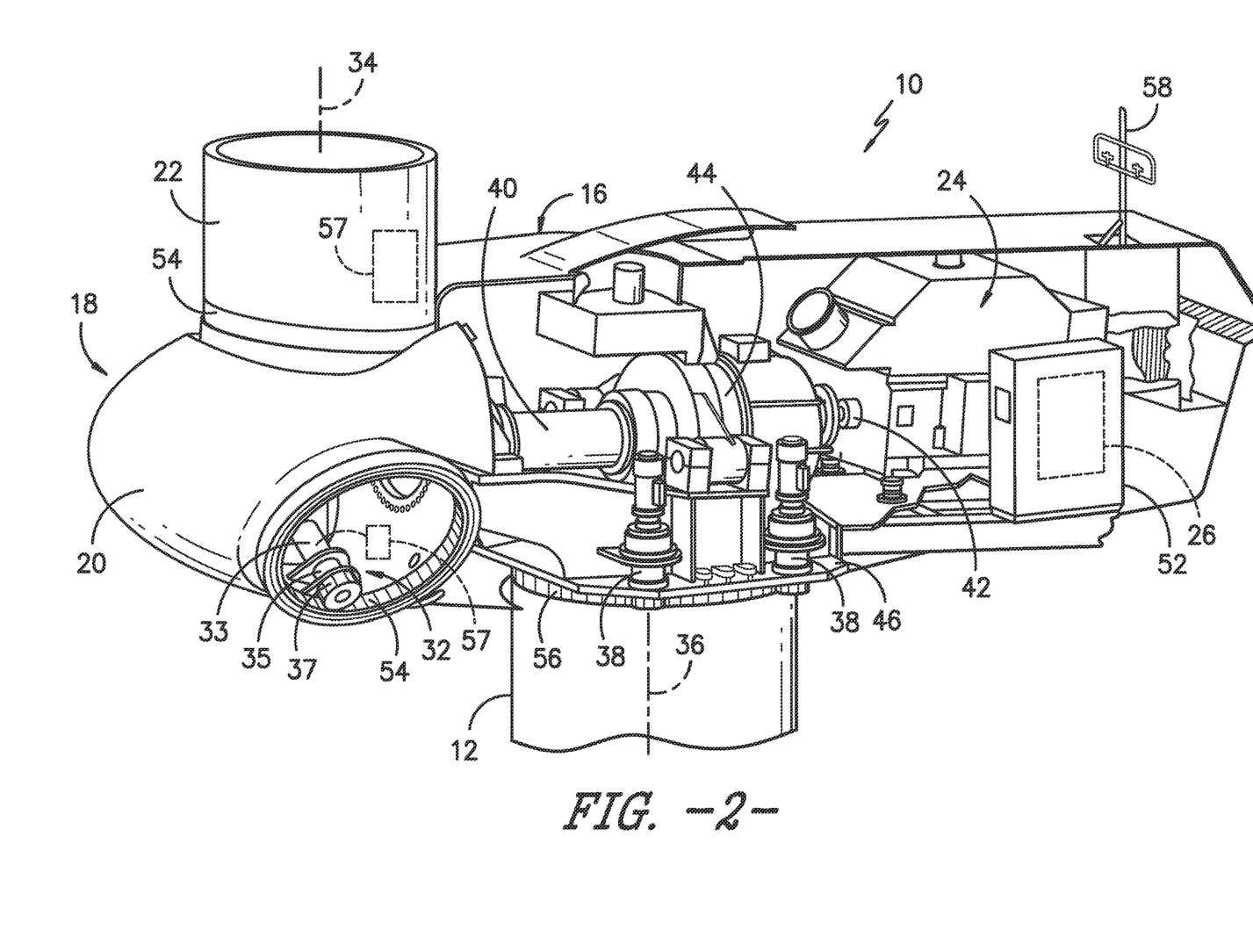
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10 to rotate the nacelle 16 about a yaw axis 36).

Further, the turbine controller 26 may also be communicatively coupled to each pitch adjustment mechanism 32 of the wind turbine 10 (one of which is shown) through a separate or integral pitch controller 30 (FIG. 1) for controlling and/or altering the pitch angle of the rotor blades 22 (i.e., an angle that determines a perspective of the rotor blades 22 with respect to the direction 28 of the wind).

In addition, as shown in FIG. 2, one or more sensors 57, 58 may be provided on the wind turbine 10. More specifically, as shown, a wind sensor 58 may be provided on the wind turbine 10. For example, the wind sensor 58 may a wind vane, and anemometer, a LIDAR sensor, or another suitable sensor that measures wind speed and/or direction. In addition, a pitch sensor 57 may be configured with each of the pitch drive mechanism 32, e.g. to monitor various parameters of the pitch motor 33. As such, the sensors 57, 58 may further be in communication with the controller 26 and may provide related information to the controller 26. For example, the pitch sensor(s) 59 may correspond to temperature sensors that send temperature signals to the controllers 26, 30 to indicate an actual temperature of the pitch batteries, which is described in more detail herein.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
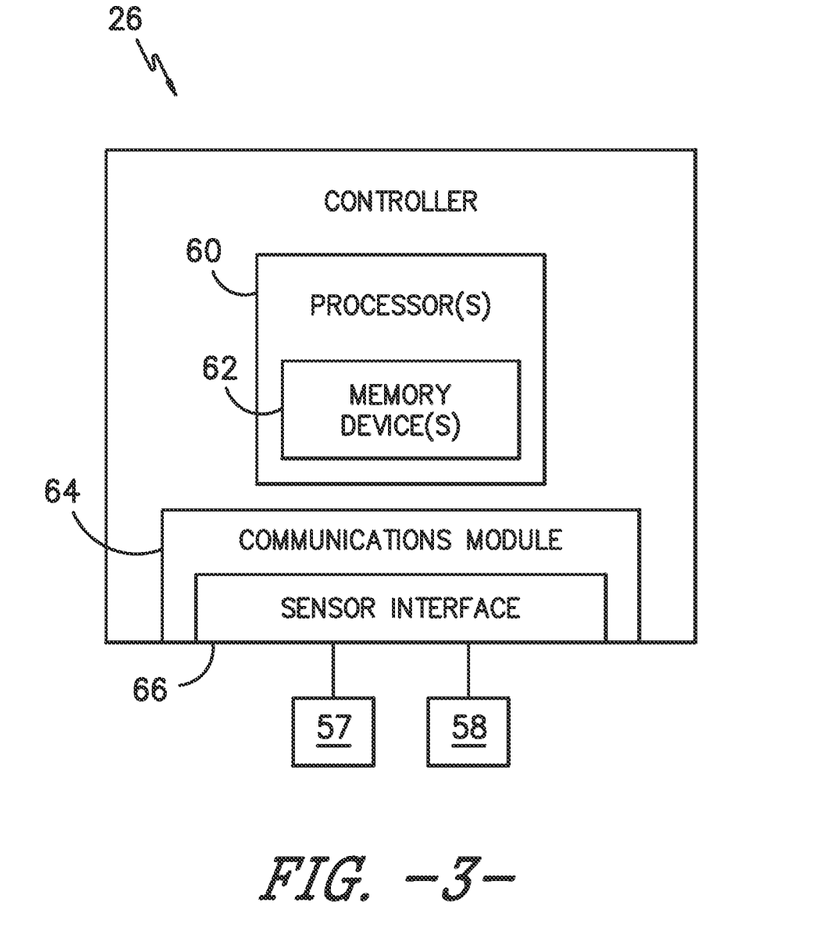
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
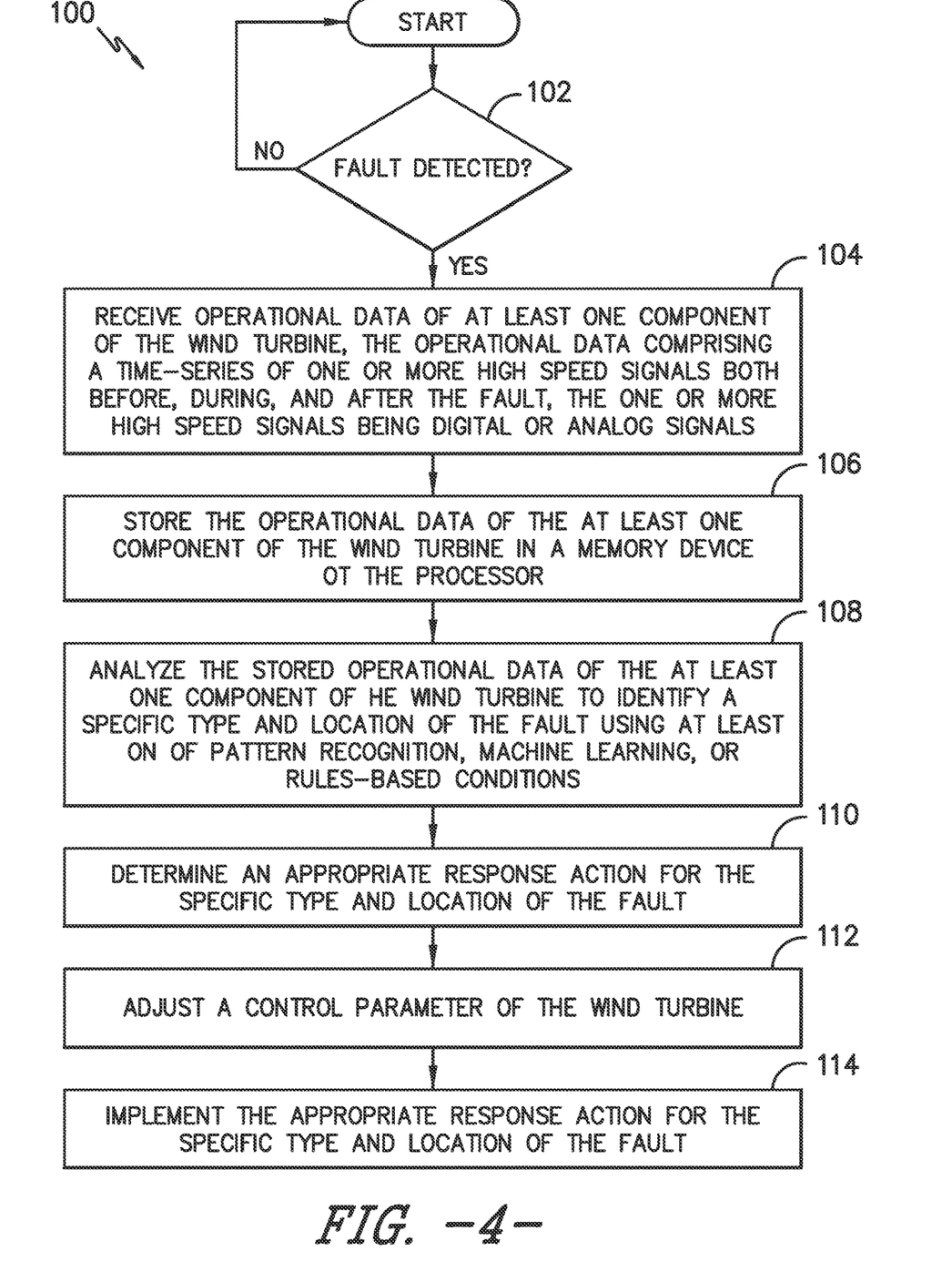
FIG. 4 illustrates a flow diagram of one embodiment of a method for controlling a wind turbine in response to anomaly detection according to the present disclosure.
Figure 5:
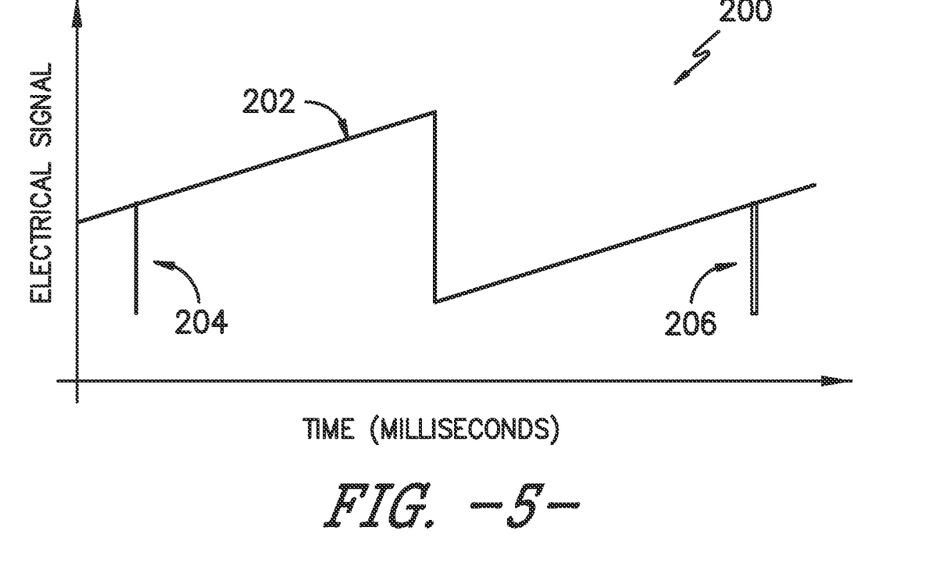
FIGS. 5 and 6 illustrate example graphs of signals from multiple wind turbine components that include an anomaly according to the present disclosure.
Figure 6:
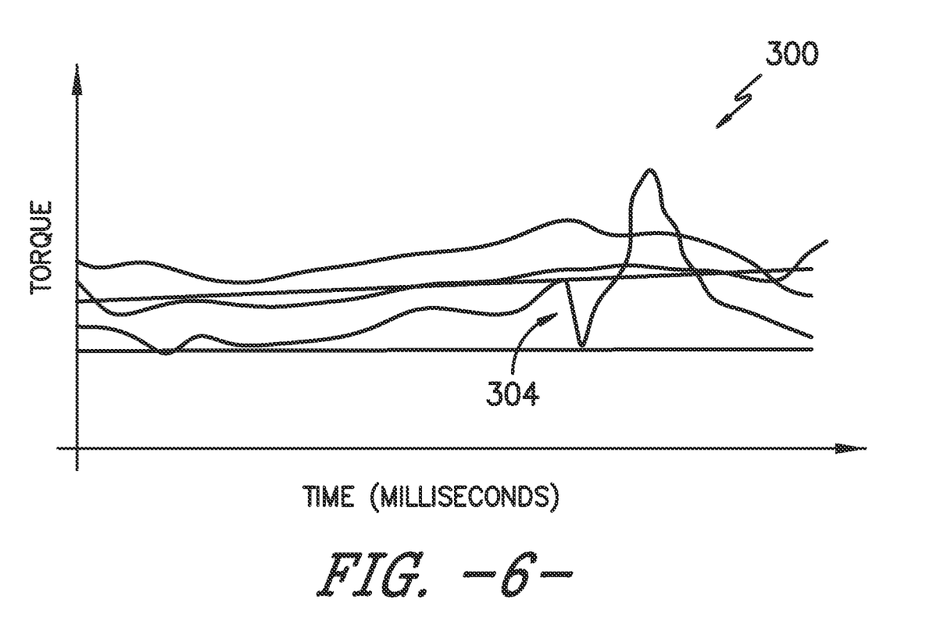
Figure 7:
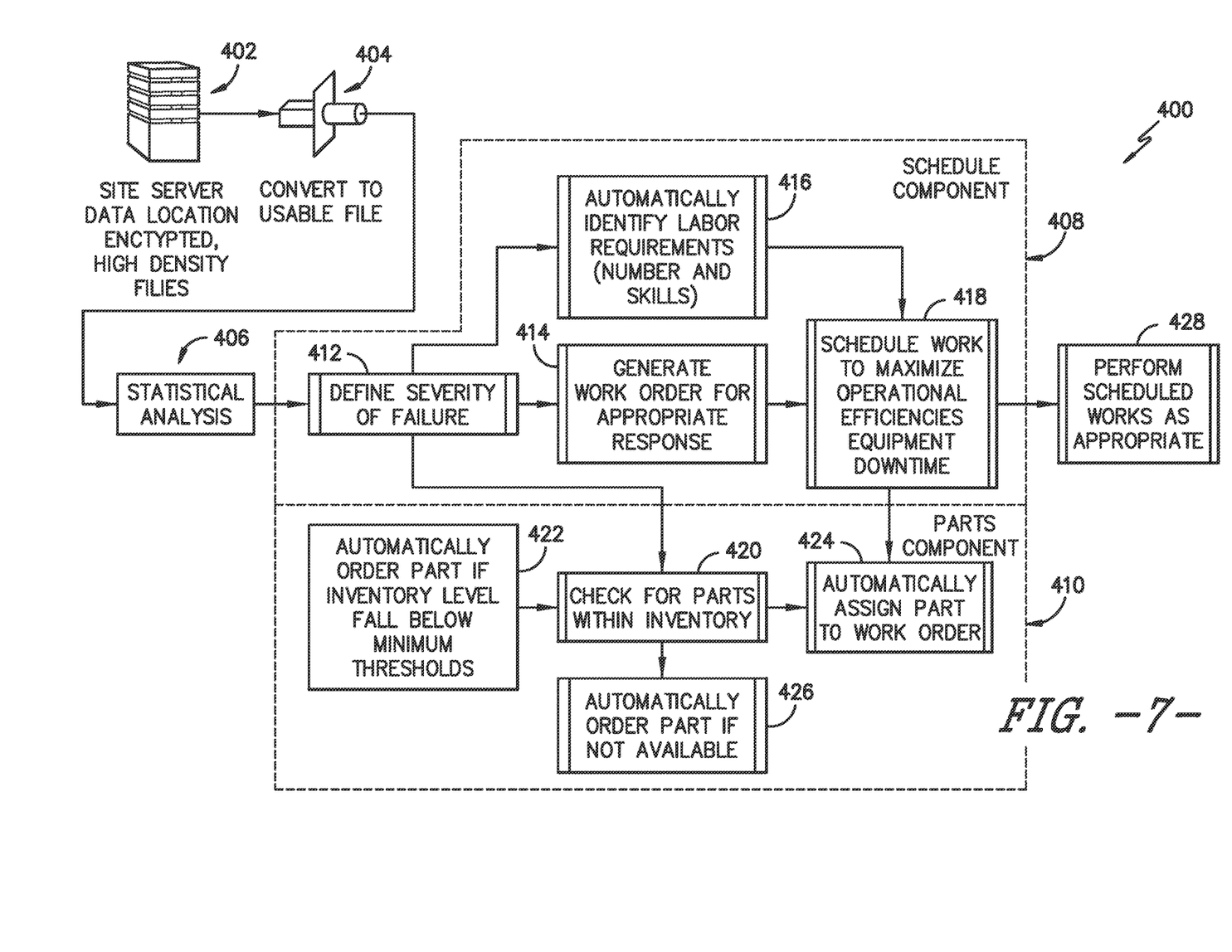
FIG. 7 illustrates a process flow diagram of one embodiment of a process implemented by a controller for controlling the wind turbine in response to anomaly detection according to the present disclosure.

Referring now to FIGS. 4-7, systems and methods for controlling a wind turbine in response to anomaly detection are illustrated in accordance with aspects of the present disclosure. More specifically, FIG. 4 illustrates a flow chat of one embodiment of a method for controlling the wind turbine 10 in response to anomaly detection according to the present disclosure. FIGS. 5 and 6 illustrate example graphs of signals from multiple wind turbine components that include an anomaly according to the present disclosure. FIG. 7 illustrates a process flow diagram of one embodiment of a process implemented by a controller for controlling the wind turbine 10 in response to anomaly detection according to the present disclosure.

Referring particularly to FIG. 4, a flow diagram of one embodiment of a method for controlling a wind turbine in response to anomaly detection according to the present disclosure is illustrated. The method 100 is explained with reference to the wind turbine 10 of FIG. 1, however, it should be appreciated that the disclosed method 100 may be implemented using any other suitable wind turbine now known or later developed in the art. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes determining whether an anomaly has been detecting in a wind turbine component, such as any of the components described herein. As shown at (104), upon detection of an anomaly in the wind turbine 10, the method 100 includes receiving, e.g. via a processor, operational data of at least one component of the wind turbine 10. It should be understood that the processor may be part of the controller 26 of the wind turbine 10 (e.g. processor(s) 60) or may be a remote controller separate from the wind turbine 10. In such instances, the processor(s) may be communicatively coupled to the turbine controller 26 to obtain the necessary data to perform the steps described herein.

Further, in an embodiment, the operational data may include a time-series of one or more high speed signals both before, during, and after the anomaly. In an embodiment, for example, the high speed signal(s) may include signals representative of at least one of current, voltage, power, torque, temperature, position, direction, displacement, vibration, or any other signal produced from or by the wind turbine 10, or combinations thereof. Further, the high speed signal(s) may be digital and/or analog signals. Moreover, as described herein, high speed signals generally refer to signals collected within a short or quick time frame, such as in milliseconds rather than seconds, minutes, or hours. Since electronics and high speed equipment generally fail in the milliseconds-time frame, it is important to have the capability to collect and view such faults in short time frames. Moreover, the high speed signals may also be high density signals, high resolution signals, or combinations thereof so as to obtain the best possible view of how the wind turbine 10 is performing.

Referring still to FIG. 4, as shown at (106), the method 100 may include storing the operational data of the component(s) of the wind turbine 10 in a memory device of the processor (such as the memory device(s) 62 or a separate or remote memory device). The processor may also collect and evaluate the operational data in real-time. In additional embodiments, the method 100 may also include identifying any pertinent information associated with the anomaly and storing the pertinent information in a memory device of the processor. For example, in an embodiment, the method 100 may include determining one or more operational parameters of the wind turbine 10 upon detection of the anomaly. Such operational parameter(s) of the wind turbine 10 may include wind speed, wind direction, environmental conditions, grid conditions, pitch angle, rotor speed, generator speed, power output, or generator torque. Thus, the processor is configured to evaluate other conditions that may be affecting the high speed signals leading up to, during, and after the anomaly. Accordingly, the processor is configured to correlate the high speed signal(s) to the operational parameter(s), e.g. to evaluate an effect of the operational parameter(s) on the high speed signal(s).

As shown at (108), the method 100 includes analyzing, via the processor, the stored operational data of the component(s) of the wind turbine 10 to identify a specific type and location of the anomaly using at least one of pattern recognition, machine learning, or rules-based conditions. For example, in an embodiment, prior to detection of the anomaly, the processor or personnel can predetermine or develop a plurality of different patterns of high speed signal abnormalities that each represent a different fault or operational state of the component(s) of the wind turbine 10. Furthermore, the different patterns may be stored in the memory device.

Accordingly, upon detection of the anomaly, the processor can identify a pattern from the different stored patterns that corresponds to a pattern of the high speed signal(s) of the operational data stored within the memory device.

Such a process can be better understood with reference to FIGS. 5 and 6. More specifically, as shown, example graphs 200, 300 of high speed signals 202, 302 from a slip ring and a pitch motor keyway are illustrated, respectively. In particular, FIG. 5 illustrates a high speed signal 202 of the slip ring connection. As shown at 204 and 206, the processor detects and identifies anomalies in the signal pattern. In this example, the anomalies 204, 206 represent a signal loss at a repeatable rotor position. In addition, as shown, the duration of each of the anomalies varies from one to the next. Upon inspection, the slip ring contained a surface defect. Accordingly, such a pattern and problem (i.e. a surface defect) can be stored for subsequent use and comparison to other signals by the processor.

Similarly, FIG. 6 illustrates a high speed signal 302 of the pitch motor keyway. As shown at 304, the processor detects and identifies an anomaly in the signal pattern. In this example, the anomaly 304 represents a significant torque shift in a single rotor blade. In addition, as shown, blade angle movement is not consistent. Upon inspection, the pitch motor keyway had slipped. Accordingly, such a pattern and problem (i.e. a slipped pitch motor keyway) can be stored for subsequent use and comparison to other signals by the processor. It should be understood that FIGS. 5 and 6 are provided as examples only and are not meant to be limiting. Rather, the system and method of the present disclosure can be applied to any signals from any wind turbine component. Thus, the processor may include a variety of different anomaly patterns for any or all of the wind turbine components. Further, such patterns can be improved and/or updated overtime using additional human expertise and/or machine learning. Accordingly, the present disclosure allows for quick recognition of specific trends such that the processor can respond appropriately.

More specifically, and referring back to FIG. 4, as shown at (110), the method 100 includes determining, via the processor, an appropriate response action for the specific type and location of the anomaly. For example, in certain embodiments, the appropriate response action may include at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof. In several embodiments, for example, the method 100 may include scheduling the maintenance action based on the operational parameter(s) of the wind turbine 10 collected at the time of the anomaly so as to maximize operational efficiency of the wind turbine 10 and to minimize equipment downtime. In yet another embodiment, the appropriate response action may be implemented automatically by the processor.

As shown at (112), the method 100 includes adjusting control of the wind turbine 10. For example, in certain embodiments, the processor may adjust the control of the wind turbine 10 by shutting down the wind turbine 10, derating the wind turbine 10, uprating the wind turbine 10, or modifying a control setting of the wind turbine 10 (such as pitch or yaw angle). As shown at (114), the method 100 includes implementing, via the processor, the appropriate response action for the specific type and location of the anomaly. In yet another embodiment, the method 100 may also include checking to ensure the response action(s) corrected the anomaly.

Referring now to FIG. 7, a process flow diagram 400 of one embodiment of a process implemented by the processor described herein for controlling the wind turbine 10 in response to anomaly detection according to the present disclosure is illustrated. For example, as shown at (402), a server or processor includes a memory device for storing the high speed signals described herein. As shown at (404), the stored data can be converted to a usable file. As shown at (406), various statistical analysis can be performed on the usable file to determine part failure, e.g. before an outage. For example, such statistical analysis may include spectral analysis, distortion, tuning, filtering, amplifying, leveling, curve fitting, etc. As shown within boxes (408) and (410), upon detection of a failure, various scheduling and/or parts actions can occur. Within the scheduling component 408, for example, as shown at (412), the processor can define a severity of the anomaly or failure. As shown at (414) and (416), the processor can generate a work order for an appropriate response to the anomaly and also automatically identify labor requirements associated with the anomaly. As shown at (418), the processor can then schedule the required work to maximize operational efficiencies and minimize downtime of the wind turbine 10.

Within the parts components 410, as shown at (420), the processor can also be checking for parts within the current inventory. Depending on whether parts are needed, as shown at (422), (424), and (426), respectively, the parts components 410 can automatically order parts if the inventory falls below a certain threshold, automatically assign parts to a work order, and/or automatically order parts if unavailable. Accordingly, as shown at (428), the processor can schedule the required work as appropriate.

Various aspects and embodiments of the present invention are defined by the following numbered clauses:

Clause 1. A method for controlling a wind turbine in response to anomaly detection, the method comprising:
receiving, via a processor, operational data of at least one component of the wind turbine, the operational data comprising a time-series of one or more high speed signals both before, during, and after an anomaly, the one or more high speed signals being digital or analog signals;
storing the operational data of the at least one component of the wind turbine in a memory device of the processor;
analyzing, via the processor, the stored operational data of the at least one component of the wind turbine to identify a specific type and location of the anomaly using at least one of pattern recognition, machine learning, or rules-based conditions; determining, via the processor, an appropriate response action for the specific type and location of the anomaly;
adjusting control of the wind turbine; and,
implementing, via the processor, the appropriate response action for the specific type and location of the anomaly.

Clause 2. The method of clause 1, wherein the one or more high speed signals comprises signals representative of at least one of current, voltage, power, torque, temperature, position, direction, displacement, vibration, or combinations thereof.

Clause 3. The method of any of the preceding clauses, wherein analyzing the stored operational data of the at least one component of the wind turbine to identify the specific type and location of the anomaly further comprises:
prior to detection of the anomaly, determining a plurality of different patterns of high speed signals each representing a different fault or operational state of the at least one component of the wind turbine; and,
storing the plurality of different patterns in the memory device.

Clause 4. The method of clause 3, wherein analyzing the stored operational data of the at least one component of the wind turbine to identify the specific type and location of the anomaly further comprises identifying a pattern from the plurality of different patterns that corresponds to a pattern of the one or more high speed signals of the operational data stored within the memory device.

Clause 5. The method of any of the preceding clauses, further comprising identifying pertinent information associated with the anomaly and storing the pertinent information in the memory device.

Clause 6. The method of clause 3, further comprising determining one or more operational parameters of the wind turbine upon detection of the anomaly, the one or more operational parameters of the wind turbine comprising at least one of wind speed, wind direction, environmental conditions, grid conditions, pitch angle, rotor speed, generator speed, power output, or generator torque.

Clause 7. The method of clause 6, wherein analyzing the stored operational data of the at least one component of the wind turbine to identify the specific type and location of the anomaly further comprises correlating the one or more high speed signals to the one or more operational parameters to evaluate an effect of the one or more operational parameters on the one or more high speed signals.

Clause 8. The method of clause 3, wherein analyzing the stored operational data of the at least one component of the wind turbine to identify the specific type and location of the anomaly further comprises defining a severity of the anomaly.

Clause 9. The method of clause 4, wherein the appropriate response action further comprises at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof.

Clause 10. The method of clause 9, wherein the appropriate response action is implemented automatically.

Clause 11. The method of clause 9, further comprising scheduling the maintenance action based on the one or more operational parameters of the wind turbine to maximize operational efficiency of the wind turbine and to minimize equipment downtime.

Clause 12. The method of any of the preceding clauses, wherein adjusting the control of the wind turbine further comprises shutting down the wind turbine, derating the wind turbine, uprating the wind turbine, or modifying a control setting of the wind turbine.

Clause 13. A system for controlling a wind turbine in response to anomaly detection, the system comprising:
  a processor configured to implement a plurality of operations, the plurality of operations comprising:
  receiving operational data of at least one component of the wind turbine, the operational data comprising a time-series of one or more high speed signals both before, during, and after an anomaly, the one or more high speed signals being digital or analog signals;
  analyzing the operational data of the at least one component of the wind turbine to identify a specific type and location of the anomaly using at least one of pattern recognition, machine learning, or rules-based conditions;
  determining an appropriate response action for the specific type and location of the anomaly;
  adjusting control of the wind turbine; and,
  implementing the appropriate response action for the specific type and location of the anomaly.

Clause 14. The system of clause 13, wherein the one or more high speed signals comprises signals representative of at least one of current, voltage, power, torque, temperature, position, direction, displacement, vibration, or combinations thereof.

Clause 15. The system of clauses 13-14, wherein the processor is part of a controller of the wind turbine.

Clause 16. The system of clauses 13-15, wherein the processor is a remote controller separate from the wind turbine.

Clause 17. The system of clauses 13-16, wherein analyzing the stored operational data of the at least one component of the wind turbine to identify the specific type and location of the anomaly further comprises:
  prior to detection of the anomaly, determining a plurality of different patterns of high speed signals each representing a different fault or operational state of the at least one component of the wind turbine;
  storing the plurality of different patterns in the memory device; and,
  identifying a pattern from the plurality of different patterns that corresponds to a pattern of the one or more high speed signals of the operational data stored within the memory device.

Clause 18. The system of clauses 13-17, wherein the plurality of operations further comprise determining one or more operational parameters of the wind turbine upon detection of the anomaly, the one or more operational parameters of the wind turbine comprising at least one of wind speed, wind direction, environmental conditions, grid conditions, pitch angle, rotor speed, generator speed, power output, or generator torque, and wherein analyzing the operational data of the at least one component of the wind turbine to identify the specific type and location of the anomaly further comprises correlating the one or more high speed signals to the one or more operational parameters to evaluate an effect of the one or more operational parameters on the one or more high speed signals.

Clause 19. The system of clauses 13-18, wherein the appropriate response action further comprises at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof.

Clause 20. A method for controlling a wind turbine in response to anomaly detection, the method comprising:
  determining, via a processor, a plurality of different patterns of high speed signals of the wind turbine, each of the plurality of different patterns representing a different fault or operational state of the at least one component of the wind turbine; storing the plurality of different patterns in a memory device of the processor;
  receiving, via the processor, operational data of at least one component of the wind turbine, the operational data comprising a time-series of high speed signals both before, during, and after an anomaly, the time-series of high speed signals being digital or analog signals;
  identifying a pattern from the plurality of different patterns that corresponds to a pattern of the time-series of high speed signals of the operational data stored within the memory device to identify a specific type and location of the anomaly using at least one of pattern recognition, machine learning, or rules-based conditions;
  generating and sending, via the processor, an alarm indicative of the specific type and location of the anomaly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for controlling a wind turbine in response to anomaly detection, the method comprising:
  receiving, via a processor, operational data of at least one component of the wind turbine, the operational data comprising a time-series of one or more high speed signals both before, during, and after an anomaly, the one or more high speed signals being digital or analog signals;
storing the operational data of the at least one component of the wind turbine in a memory device of the processor;
identifying, via the processor, a specific type and location of the anomaly by applying at least one of pattern recognition, machine learning, or rules-based conditions to the stored operational data of the at least one component of the wind turbine;
determining, via the processor, an appropriate response action for the specific type and location of the anomaly;
adjusting control of the wind turbine; and
implementing, via the processor, the appropriate response action for the specific type and location of the anomaly.

2. The method of claim 1, wherein the one or more high speed signals comprises signals representative of at least one of current, voltage, power, torque, temperature, position, direction, displacement, vibration, or combinations thereof.

3. The method of claim 1, further comprising:
prior to detection of the anomaly, determining a plurality of different patterns of high speed signals each representing a different fault or operational state of the at least one component of the wind turbine; and
storing the plurality of different patterns in the memory device.

4. The method of claim 3, wherein identifying the specific type and location of the anomaly by applying at least one of pattern recognition, machine learning, or rules-based conditions to the stored operational data of the at least one component of the wind turbine further comprises identifying a pattern from the plurality of different patterns that corresponds to a pattern of the one or more high speed signals of the operational data stored within the memory device.

5. The method of claim 4, wherein the appropriate response action further comprises at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof.

6. The method of claim 5, wherein the appropriate response action is implemented automatically.

7. The method of claim 5, further comprising scheduling the maintenance action based on the one or more operational parameters of the wind turbine to maximize operational efficiency of the wind turbine and to minimize equipment downtime.

8. The method of claim 3, further comprising determining one or more operational parameters of the wind turbine upon detection of the anomaly, the one or more operational parameters of the wind turbine comprising at least one of wind speed, wind direction, environmental conditions, grid conditions, pitch angle, rotor speed, generator speed, power output, or generator torque.

9. The method of claim 8, further comprising correlating the one or more high speed signals to the one or more operational parameters to evaluate an effect of the one or more operational parameters on the one or more high speed signals.

10. The method of claim 3, further comprising defining a severity of the anomaly.

11. The method of claim 1, further comprising identifying pertinent information associated with the anomaly and storing the pertinent information in the memory device.

12. The method of claim 1, wherein adjusting the control of the wind turbine further comprises shutting down the wind turbine, derating the wind turbine, uprating the wind turbine, or modifying a control setting of the wind turbine.

13. A system for controlling a wind turbine in response to anomaly detection, the system comprising:
a processor configured to implement a plurality of operations, the plurality of operations comprising:
receiving operational data of at least one component of the wind turbine, the operational data comprising a time-series of one or more high speed signals both before, during, and after an anomaly, the one or more high speed signals being digital or analog signals;
identifying a specific type and location of the anomaly by applying at least one of pattern recognition, machine learning, or rules-based conditions to the operational data of the at least one component of the wind turbine;
determining an appropriate response action for the specific type and location of the anomaly;
adjusting control of the wind turbine; and
implementing the appropriate response action for the specific type and location of the anomaly.

14. The system of claim 13, wherein the one or more high speed signals comprises signals representative of at least one of current, voltage, power, torque, temperature, position, direction, displacement, vibration, or combinations thereof.

15. The system of claim 13, wherein the processor is part of a controller of the wind turbine.

16. The system of claim 13, wherein the processor is a remote controller separate from the wind turbine.

17. The system of claim 13, wherein identifying the specific type and location of the anomaly by applying at least one of pattern recognition, machine learning, or rules-based conditions to the stored operational data of the at least one component of the wind turbine further comprises:
prior to detection of the anomaly, determining a plurality of different patterns of high speed signals each representing a different fault or operational state of the at least one component of the wind turbine;
storing the plurality of different patterns in the memory device; and
identifying a pattern from the plurality of different patterns that corresponds to a pattern of the one or more high speed signals of the operational data stored within the memory device.

18. The system of claim 13, wherein the plurality of operations further comprise determining one or more operational parameters of the wind turbine upon detection of the anomaly, the one or more operational parameters of the wind turbine comprising at least one of wind speed, wind direction, environmental conditions, grid conditions, pitch angle, rotor speed, generator speed, power output, or generator torque, and further comprising correlating the one or more high speed signals to the one or more operational parameters to evaluate an effect of the one or more operational parameters on the one or more high speed signals.

19. The system of claim 13, wherein the appropriate response action further comprises at least one of scheduling a maintenance action, identifying required labor, generating a work order, checking inventory for one or more parts, assigning one or more parts to a work order, ordering one or more parts if the one or more parts is unavailable, ordering one or more parts if the one or more parts falls below a minimum threshold, generating an alarm, or combinations thereof.

\* \* \* \* \*